United States Patent [19]

Kitajima et al.

[11] 4,122,444

[45] Oct. 24, 1978

[54] APPARATUS FOR DISPLAYING NUMERICAL VALUE INFORMATION IN ALTERNATIVE FORMS

[75] Inventors: Kenichi Kitajima; Akira Nagano, both of Nagaokakyo; Kazuaki Urasaki, Muko, all of Japan

[73] Assignee: Omron Tateisi Electronics Co., Japan

[21] Appl. No.: 656,923

[22] Filed: Feb. 10, 1976

[30] Foreign Application Priority Data

| | | | |
|---|---|---|---|
| Feb. 20, 1975 | [JP] | Japan | 50-22996 |
| Feb. 20, 1975 | [JP] | Japan | 50-22997 |

[51] Int. Cl.$^2$ .............. G06F 3/14

[52] U.S. Cl. .............. 340/324 R; 35/6; 40/451; 340/336; 40/463

[58] Field of Search .............. 340/336, 324 R, 311, 340/146.3 AH; 178/22, 30; 35/6, 29, 35 R, 36, 8 R; 356/5; 197/1 A, 1.5, 4; 235/92 EA; 40/53 R

[56] References Cited

U.S. PATENT DOCUMENTS

| | | | |
|---|---|---|---|
| 3,319,516 | 5/1967 | Brown | 40/53 R |
| 3,371,321 | 2/1968 | Adams | 35/8 R |
| 3,502,793 | 3/1970 | Dumaire | 178/22 |
| 3,513,968 | 5/1970 | Hanson | 197/1 A |
| 3,900,259 | 8/1975 | Mott et al. | 356/5 |
| 3,971,012 | 7/1976 | Morokawa et al. | 340/336 |

*Primary Examiner*—Marshall M. Curtis
*Attorney, Agent, or Firm*—Staas & Halsey

[57] ABSTRACT

An apparatus for displaying numerical value information, comprising: a first display having a plurality of digit display positions each capable of selectively displaying one of Arabic numerals; a second display having a plurality of digit display positions each capable of selectively displaying one of Arabian language numerals; a digit timing signal generator; a first and second digit drivers responsive to said digit timing signals for enabling said digit display positions of each of said first and second displays, respectively, in a digit timing sequence; a re-circulation shift register operable responsive to said digit timing signals for storing a signal representing multi-digit numerical value information comprising a plurality of digit numeral signals each representing in a bit-coded manner a value of the numeral to be displayed in the corresponding digit display position in said displays; a first converter coupled to a predetermined digit position of said register for withdrawing in said digit timing sequence a digit numeral signal for converting it into an Arabic numeral signal for representing said digit numeral signal by the Arabic numerals so as to be commonly applied to said multi-digit display positions in said first display; and a second converter for converting the output from said first converter into an Arabian language numeral signal for representing said digit numeral signal by the Arabian language numerals so as to be commonly applied to said multi-digit display positions in said second display; whereby the numeral in the respective digit of said multi-digit numerical value information is displayed in the corresponding digit display position in said first and second displays in said digit timing sequence, by Arabic and Arabian language numerals, respectively.

30 Claims, 18 Drawing Figures

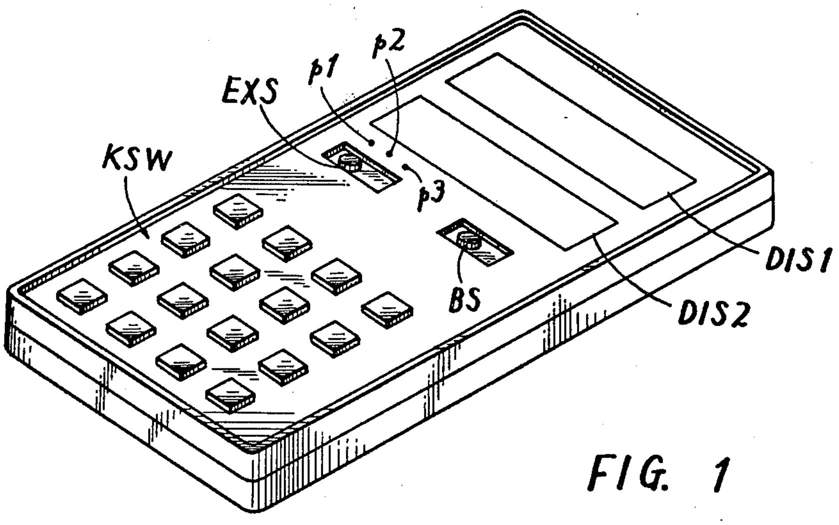
FIG. 1
| | | | | | | | | | |
|---|---|---|---|---|---|---|---|---|---|
| 1 | 2 | 3 | 4 | 5 | 6 | 7 | 8 | 9 | 10 |
| ١ | ٢ | ٣ | ٤ | ٥ | ٦ | ٧ | ٨ | ٩ | ١٠ |
FIG. 2
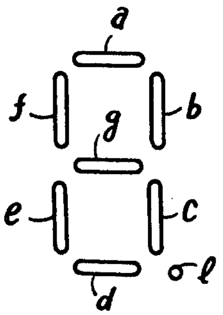
FIG. 3
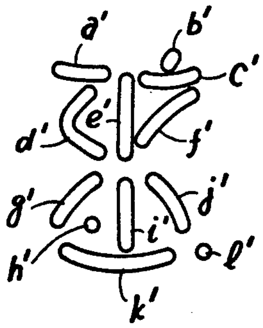
FIG. 4

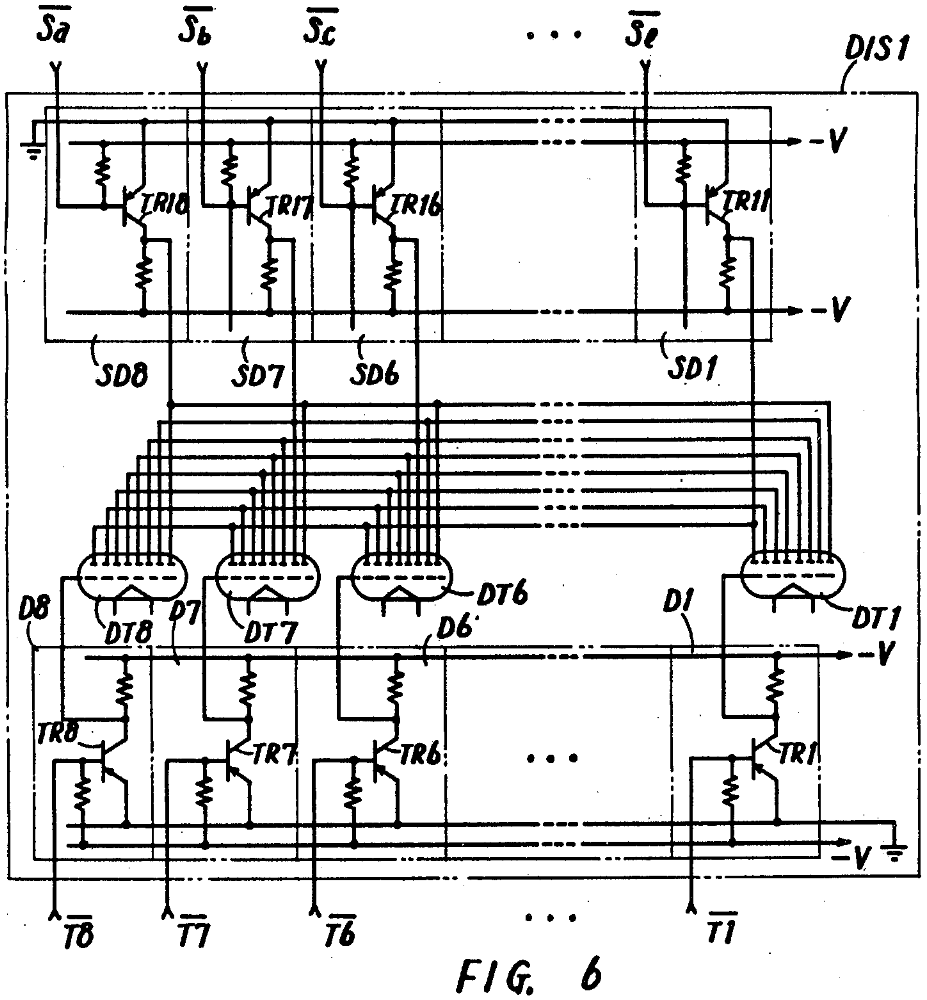
FIG. 6
FIG. 9
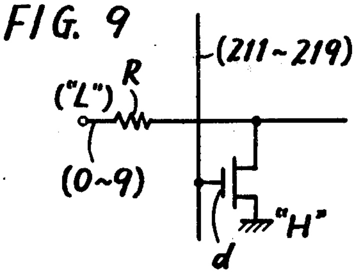
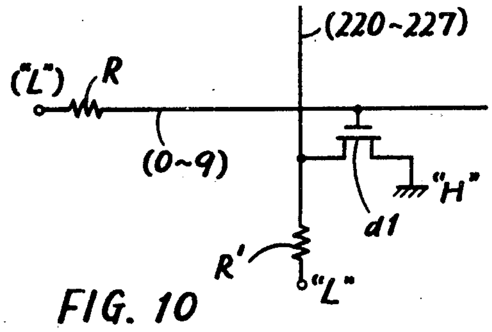
FIG. 10

APPARATUS FOR DISPLAYING NUMERICAL VALUE INFORMATION IN ALTERNATIVE FORMS

BACKGROUND OF THE INVENTION

1. Field of the Invention

The present invention relates to an apparatus for displaying numerical value information. More specifically, the present invention relates to such an apparatus for displaying multi-digit numerical value information by either or both of first and second different kinds of groups of numeral characters.

2. Description of the Prior Art

Numerical value information is typically processed today in electronic data processing machines, from which the resultant numerical value information is then taken for some desired subsequent purpose. The resultant numerical value information is sometimes converted ultimately to a visual indication for observation by an operator. Devices for such visual indication may be of various types, such as flourescent segment arranged indicating tubes, Nixie type discharge tubes, cathode ray tubes, and the like. For the purpose of indication of multi-digit numerical value information each digit having a value of one of a set of numerals, a display having a predetermined plurality of digit display positions is provided. Typically, such a set of numerals is comprised of the numerals zero through nine.

For the purpose of display of numerical value information, a display has been most widely used which is capable of displaying the numeral characters of Arabic numerals. However, in some countries the numeral characters of Arabic numerals are not so familiar to the nations and are often hardly understood. Recently small sized electronic numerical data processing machines such as portable type or desk top type electronic calculators have been manufactured and widely used, which are typically provided with a display capable of displaying Arabic numerals. Such calculators, however, are inconvenient for those in the Arabian language countries where the Arabian language numerals have been more often used. Hence, it is desired that electronic numerical data processing machines are provided wherein a display capable of selectively displaying numerical value information by either or both of first and second different kinds of groups of numeral characters, such as Arabic numerals and Arabian language numerals. The present invention achieves that purpose.

SUMMARY OF THE INVENTION

Briefly stated, the present invention comprises an apparatus for displaying numerical value information, comprising: display means capable of displaying multi-digit numerical value information by first and second different kinds of groups of numeral characters, each digit of said multi-digit numerical value information having a value of one of a set of numerals: means for providing a signal representing multi-digit numerical value information, said multi-digit numerical value information comprising a plurality of digit numeral signals, each of said numeral signals representing, in a coded fashion of a plurality of bits, a value of the numeral to be displayed in the corresponding digit display position in said display means; converting means for converting said digit numeral signal in the respective digit of said coded multi-digit numerical value information signal into first and second kinds of character signals for representing said coded multi-digit numerical value information by said first and second kinds of groups of numeral characters; and means responsive to said first and second kinds of character signals for driving said display means for selectively displaying said coded multi-digit numerical value information by either or both of said first and second kinds of groups of numeral characters, respectively.

According to the present invention, the resultant numerical value information as processed by electronic numerical data processing machines, such as electronic calculators, is selectively displayed by either or both of first and second different kinds of groups of numeral characters, such as Arabic numerals and Arabian language numerals. Preferably, selecting means is provided for selecting display of the numerical value information by either or both of said first and second different kinds of groups of numeral characters.

In a preferred embodiment, said coded multi-digit numerical value information signal is first converted into a set of individual signals each uniquely identifying the numeral in the respective digit in said coded multi-digit numerical value information, and said individual numeral identifying signal is then converted into said first and second different kinds of character signals for representing said coded multi-digit numerical value information by said first and second different kinds of groups of numeral characters.

Therefore, a principal object of the present invention is to provide an apparatus for displaying numerical value information wherein said numerical value information is displayed by first and second different kinds of groups of numeral characters.

Another object of the present invention is to provide an improved apparatus for displaying numerical value information wherein said numerical value information is selectively displayed by either or both of first and second different kinds of groups of numeral characters.

A further object of the present invention is to provide an improved apparatus for displaying numerical value information, which comprises a simplified structure for converting said numerical value information into two sets of numeral character signals for displaying said numerical value information by first and second different kinds of groups of numeral characters.

These objects and other objects, features and advantages of the present invention will be better understood when taken in conjunction with the accompanying drawings.

BRIEF DESCRIPTION OF THE DRAWINGS

FIG. 1 is a perspective view of a desk top electronic calculator of an embodiment of the present invention;

FIG. 2 is a table showing a relation between a group of numeral characters of Arabic numerals and a group of numeral characters of Arabian language numerals;

FIG. 3 is a view of a numeral display unit in the respective digit display position in the display DIS1 in the FIG. 1 embodiment, said unit having a plurality of segments arranged in a minus-in-square shape or 8 shape for displaying selectively one of a group of numeral characters of Arabic numerals through selective light emission therefrom;

FIG. 4 is a view of a numeral display unit in the respective digit display position in the display DIS2 in the FIG. 1 embodiment, said unit having a plurality of segments arranged as shown for displaying selectively one of a group of numeral characters of Arabian language numerals through selective light emission therefrom;

FIG. 6 is a schematic diagram of the first display DIS1 in the FIG. 5 embodiment, to which a schematic diagram of the second display DIS2 is similar;

FIGS. 9 and 10 show a connection of the row and column signal lines by means of MOS transistors in the FIG. 8 circuit;

DESCRIPTION OF THE PREFERRED EMBODIMENTS

Figure 5:
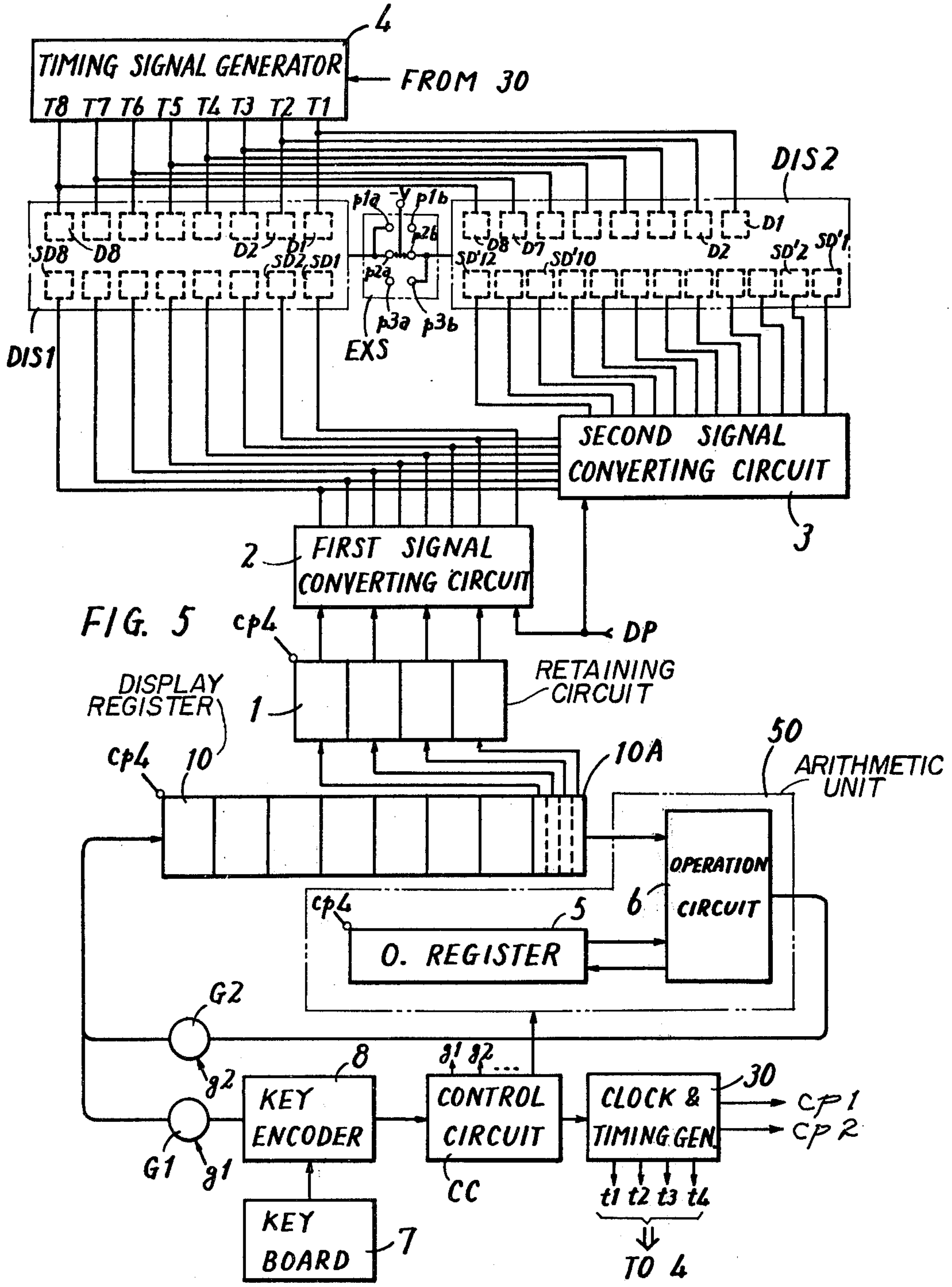
FIG. 5 is a block diagram of a desk top electronic calculator employing the present invention to be embodied in the FIG. 1 calculator.

FIG. 1 is a perspective view of a desk top electronic calculator of an embodiment of the present invention. The calculator shown comprises a first and second displays DIS1 and DIS2, respectively, arranged in parallel in the upper region on the top surface of the calculator. The calculator also comprises a switch EXS for selectively switching the two parallel-arranged displays DIS1 and DIS2. The switch EXS is adapted to be switchable to three positions P1, P2 and P3, such that the first display DIS1 is enabled when the switch EXS is turned to the first position P1, the first and second displays DIS1 and DIS2 are enabled when the switch EXS is turned to the second position P2 and the second display DIS3 is enabled when the switch EXS is turned to the third position P3. The calculator shown further comprises a power switch BS and a group of key switches, generally denoted as KSW, provided on the top surface of the calculator. The first and second displays DIS1 and DIS2 each comprises a plurality of display tubes positioned in the respective digit display positions, thereby to display multi-digit numerical value information. Each of the displays DIS1 and DIS2 is adapted to be capable of displaying multi-digit numerical value information by a predetermined kind of group of numeral characters which kind of group is different from each other. In the embodiment shown, the first display DIS1 is adapted to display the numerical value information by a group of numeral characters representing Arabic numerals most generally used, while the second display DIS2 is adapted to display numerical value information by a group of numeral characters representing the numerals of the Arabian language (referred to as "Arabian language numerals" hereinafter).

FIG. 2 is a table showing a relation between a group of numeral characters of Arabic numerals and a group of numeral characters of Arabian language numerals. As seen from the table, the numeral characters of the Arabian language numerals each have a character configuration shown in the lower row corresponding to the Arabic numerals 1 through 10 shown in the upper row of the table. Each digit display tube of the first display DIS1 comprises a numeral display unit having a plurality of segments arranged typically in a minus-in-square shape or 8 shape, as shown in FIG. 3, in order to selectively display one numeral character out of a group of numeral characters of Arabic numerals through selective light emission from the segments. Such a numeral display unit typically comprises seven segments *a* through *g* and a decimal point segment *l*. On the other hand, each digit display tube of the second display DIS2 comprises a numeral display unit having another plurality of segments arranged in the pattern as shown in FIG. 4 in order to selectively display one numeral character out of a group of the numeral characters of the Arabian lanugage numerals through selective light emission from the segments. The Arabian language numeral display unit as shown in FIG. 4 typically comprises eleven segments *a'* through *k'* and a decimal point segment *l'*. These segments may be made of a liquid crystal area, an array of light emitting diodes, a flourescent area or the like, which are individually connected to a driver so as to be enabled to emit light, whereby selective light emission from these segments forms one numeral character out of the respective group of the numerals. In order to display the value of numeral one, for example, by the corresponding Arabic numeral, the segments *b* and *c* in FIG. 3 are enabled to emit light. On the other hand, in order to display the value of the same numeral one by the corresponding Arabian language numeral, the segments *e'* and *i'* in FIG. 4 are enabled to emit light. Similarly, in order to display the value of the numeral two, the segments *a, b, g, e* and *d* in FIG. 3 are enabled to emit light, thereby to form the configuration of the corresponding Arabic numeral, and the segments *c', e'*, and *i'* in FIG. 4 are enabled to emit light, thereby to form a configuration of the corresponding Arabian language numeral.

Table 1 shows a relation between a group of numeral characters of the Arabic numerals and the segments, as shown in FIG. 3, to be enabled to form a configuration of the corresponding Arabic numerals.

Table 2 shows a relation between the group of numeral characters of the Arabian language numerals and the segments, as shown in FIG. 4, to be enabled to form a configuration of the corresponding Arabian language numerals.

Table 1

| | a | b | c | d | e | f | g | l |
|---|---|---|---|---|---|---|---|---|
| 1 | | O | O | | | | | |
| 2 | O | O | | O | O | | O | |
| 3 | O | O | O | O | | | O | |
| 4 | | O | O | | | O | O | |

Table 1-continued

| | a | b | c | d | e | f | g | l |
|---|---|---|---|---|---|---|---|---|
| 5 | O | | O | O | | O | O | |
| 6 | O | | O | O | O | O | O | |
| 7 | O | O | O | | | O | | |
| 8 | O | O | O | O | O | O | O | |
| 9 | O | O | O | O | | O | O | |
| 0 | O | O | O | O | O | O | O | |
| . | | | | | | | | O |

Table 2

| | a' | b' | c' | d' | e' | f' | g' | h' | i' | j' | k' | l' |
|---|---|---|---|---|---|---|---|---|---|---|---|---|
| ١ | | | | | O | | | | O | | | |
| ٢ | | | O | | O | | | | O | | | |
| ٣ | | O | O | | O | | | | O | | | |
| ٤ | | | | O | | | O | | | | O | |
| ٥ | | | | | | | O | | | O | O | |
| ٦ | O | | | | O | | | | O | | | |
| ٧ | | | | | O | O | | | O | | | |
| ٨ | | | | | O | | O | | | O | | |
| ٩ | | | | O | O | | | | O | | | |
| ٠ | | | | | | | | O | | | | |
| . | | | | | | | | | | | | O |

FIG. 5 is a block diagram of the desk top electronic calculator shown in FIG. 1, which also comprises a block diagram of the display apparatus of one embodiment of the present invention. An input signal as entered by means of an input device such as a key board 7 comprising a set of key switches KSW is encoded by means of a key encoder 8. Assuming that the input signal is a signal representative of multi-digit numerical value information, such a numerical value information signal is loaded in a display register 10 through a gate G1 operable as a function of a gate signal g1. Assuming that the input signal is a signal representative of function as entered by means of a function key, such a function signal is transferred to a control circuit CC, which is responsive to the function signal to provide a control signal to an arithmetic unit 50 for the purpose of controlling the operation. Operation in the electronic calculator is effected through cooperation of the display register 10 and arithmetic unit 50 and the result of operation is loaded in the display register 10 through gate G2 operable as a function of a gate signal g2. The control circuit CC also serves to generate the said gate signals g1 and g2. The arithmetic unit 50 comprises an operation register or accumulator 5 and an operation circuit 6 which is responsive to a proper function signal to effect operation with respect to the contents in the display register 10 and the contents in the operation register 5, whereupon the result of the operation is again transferred to the operation register 5, i.e. the operation register 5 is up-dated to store the result of operation.

Figure 7:
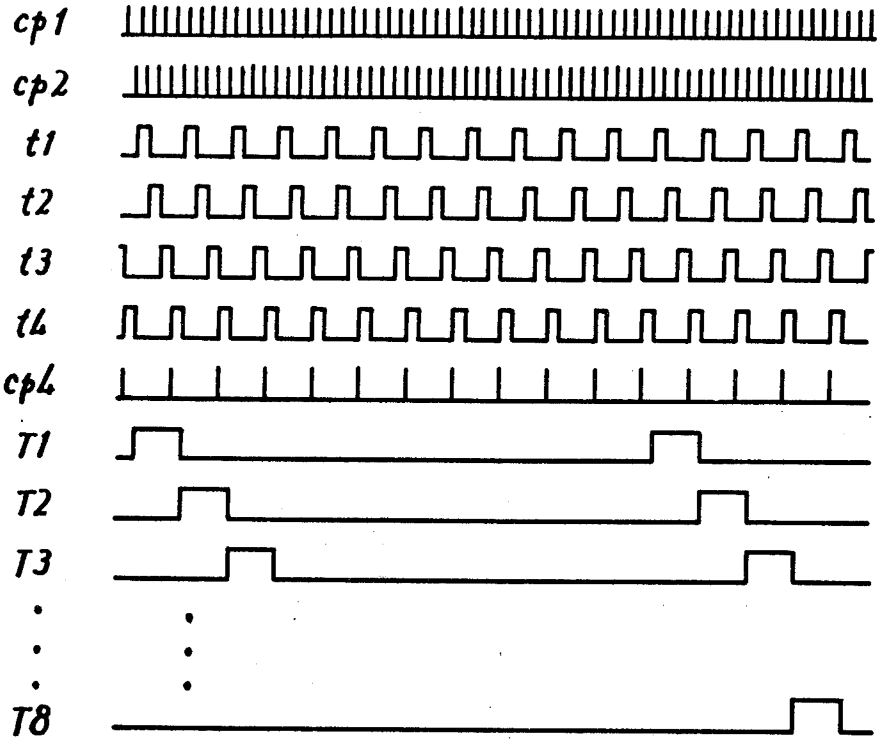
FIG. 7 shows waveforms of various clock and timing signals to be used in the FIG. 5 embodiment.

In recent electronic numerical data processing machines, such as desk top electronic calculators, for example, electronic circuits employing two-phase logic circuits operable as a function of two trains of clock pulses *cp*1 and *cp*2 out of phase with each other are utilized. In such electronic circuits, various timing signals, such as bit, digit and word timing signals, are generated based upon such clock pulses for the purpose of operation of various electronic circuits in a synchronized relation. FIG. 7 shows waveforms of these signals. Referring to FIG. 5, the above described two trains of clock pulses *cp*1 and *cp*2 out of phase with each other are generated by a clock and timing generator 30. Further, four bit timing signals *t*1, *t*2, *t*3 and *t*4 are generated by the generator 30 based on the said two trains of clock pulses *cp*1 and *cp*2. In the embodiment shown, a further train of clock pulses *cp*4 is also generated by the generator 30 as a logical product of the clock pulse *cp*1 and the bit timing signal *t*4. According to the embodiment, the digit timing signals T1, T2, T3 . . . T8 are further generated by the digit timing signal generator 4 coupled to the generator 30 based on the said bit timing signals *t*1, *t*2, *t*3 and *t*4, in the manner well known to those skilled in the art.

In the embodiment shown, the display register 10 comprises eight digit positions, each being constituted by four bit positions. It is pointed out that in FIG. 5 only the least significant digit position 10A in the register 10 is shown being constituted of four-bit structure, while other digit positions are shown by omitting illustration of such four-bit structure therein. The first to fourth bit positions of each digit position are weighted of "1", "2", "4" and "8", respectively, as well known to those skilled in the art. The coded multi-digit numerical value information signal stored in the display register 10 is circulated through the said arithmetic unit 50 and the gate G2 as a function of the clock pulse *cp*4 and only one digit component of the numerical value information signal in the register 10 is read out by the retaining circuit 1 and is retained therein for a time period of one digit as a function of the clock pulse *cp*4. The output from the retaining circuit 1 is fed as a function of a clock pulse *cp*4 to a first signal converting circuit 2, which is responsive to the four-bit coded signal from the retaining circuit 1 to convert the said four-bit coded signal into a set of individual signals each uniquely representative of a value of one of the numerals zero through nine, i.e. a set of numeral representing signals, and is responsive to the said individual numeral representing signals as thus decoded to encode them into a first group of segment selecting signals. More detailed structure of the first signal converting circuit 2 will be described subsequently with reference to FIG. 8. The segment selecting signals from the first signal converting circuit 2 are applied individually to segment drivers SD1 through SD8 for driving commonly the corresponding segments of each digit position of the first display DIS1, and also to a second signal converting circuit 3, which serves to decode the first set of segment selecting signals from the first signal converting circuit 2 into a set of individual signals each uniquely representing a value of one of the numerals zero through nine and further to encode the said decoded individual numeral representing signals into a second set of segment selecting signals. More detailed structure of the second signal converting circuit 3 will be described subsequently with reference to FIG. 11. The second set of segment selecting signals from the second signal converting circuit 3 are individually applied to segment drivers SD1' through SD12' for driving commonly the corresponding segments of each digit position of the second display DIS2.

The displays DIS1 and DIS2 each comprises display tubes (not shown in FIG. 5 for simplicity of illustration) as shown in FIGS. 3 and 4, respectively, in each of eight digit display positions, and each also comprise eight digit drivers D1 through D8 for the respective eight digit display tubes in the eight digit display positions. The corresponding segment electrodes of the respective digit display tubes are commonly connected (not shown in FIG. 5), and the said segment drivers SD1 through SD8 and SD'1 through SD'12 for driving the respective commonly connected segment electrodes are provided in the respective displays DIS1 and DIS2. The said digit drivers D1 through D8 are connected individually to receive the corresponding digit timing signals T1 through T8, respectively, provided in the digit timing sequence fromm the digit timing signal generator 4. For example, consider a case where a numeral is to be displayed in the first digit of the display DIS1. The coded numerical value information component of the corresponding digit of the numerical value information signal is read out from the said display register 10 at the digit timing one digit time before the digit time T1, i.e. at the digit timing of T8, and is retained in the retaining circuit 1 for a time period of one digit time, with the result that the retaining circuit 1 provides the numerical value information signal component corresponding to the said first digit position at the digit timing T1. The said numerical value information signal component is converted by means of the first signal converting circuit 2 into a set of segment selecting signals which are applied to the respective segment drivers SD1 through SD8 in the display DIS1. As a result, only the segment drivers out of the drivers SD1 through SD8 necessary for display of the numeral of the said numerical value information signal component are brought in an active state only during the digit time T1. At that time, only the digit driver D1 is supplied with the digit timing signal T1. As a result, the relevant segments of only the first digit display tubes are caused to emit light, thereby to display the said numeral of the said numerical value information signal component. During the following digit time T2, the first digit display tube is disabled, while only the second digit display tube is enabled as a function of digit timing signal, and thus the enabled condition of the digit display tubes proceeds in turn toward the more significant digit display positions, while the respective numerals of the corresponding numerical value information signal components are displayed in the respective digit positions. Since these operations are repeated in a high speed, display of multi-digit numerical information can be observed from the respective displays DIS1 and DIS2. The first and second displays DIS1 and DIS2 are of substantially the same circuit configuration, except for the difference in the shape and number of the segments between the displays DIS1 and DIS2. A typical example of such a circuit configuration will be explanined subsequently with reference to FIG. 6.

The said switch EXS is interconnected between the first and second displays DIS1 and DIS2. The switch EXS may be a sliding switch which comprises a sliding member SL and contacts P1*a*, P1*b*, P2*a*, P2*b*, P3*a*, P3*b*. The sliding member SL is connected to the −V voltage source which is a power supply of the displays, as to be described subsequently with reference to FIG. 6. The contacts P1*a* and P2*a* are commonly connected to the terminal of the −V voltage source of the first display DIS1. Similarly, the contacts P2*b* and P3*b* are commonly connected to the terminal of the −V voltage source of the second display DIS2. The turning of the switch EXS to the first position P1 causes the sliding member SL to contact the contacts P1*a* and P1*b*, the turning of the switch EXS to the second position P2 causes the sliding member SL to contact the contacts P2*a* and P2*b*, and the turning of the switch EXS to the third position P3 causes the sliding member SL to contact the contacts P3*a* and P3*b*, whereby selective energization of the displays DIS1 and/or DIS2 is achieved, as previously described with reference to FIG. 1.

FIG. 6 shows a schematic diagram of the first display DIS1, to which a schematic diagram of the second display DIS2 is similar, as previously pointed out. The digit timing signals generated in a digit timing sequence from the digit timing signal generator are applied, after being inverted, to bases of transistors TR1 through TR8, respectively, which serve as digit drivers D1 through D8 in FIG. 5. The segment drivers SD1 through SD8 comprising the transistors TR11 through TR18 are connected to drive or enable eight segments *a* through *l*, respectively, arranged in the said minus-in-square shape or the 8 shape and provided in each of flourescent-segment arranged tubes DT1 through DT8 of the respective digit positions. The transistors TR11 through TR18 each have the bases connected to receive the segment selecting signals $\overline{Sl}$, $\overline{Sg}$, $\overline{Sf}$, . . . $\overline{Sb}$, $\overline{Sa}$, respectively, so as to control conduction of the respective transistors. More specifically, the flourescent-segment arranged tubes DT1 through DT8 each comprise eight segment electrodes coated with a flourescent material and a common electrode provided in operative association with these segment electrodes, while the corresponding segment electrodes throughout different tubes are commonly connected. It is appreciated by those skilled in the art from the foregoing description that the display tubes in FIG. 6 are driven on the so called dynamic basis as a function of the digit timing signals generated in the digit timing sequence.

Figure 8:
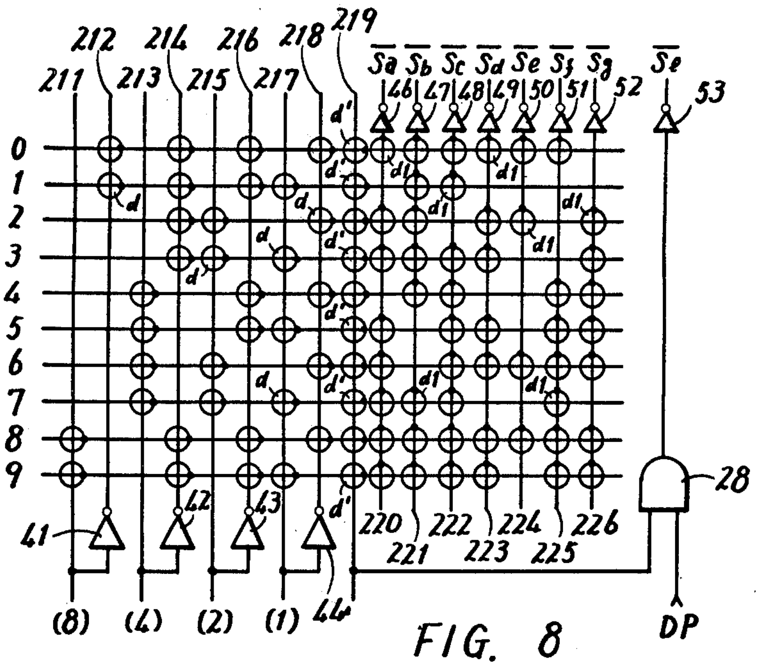
FIG. 8 is a schematic diagram of the first signal converting circuit 2 in the FIG. 5 embodiment.

FIG. 8 is a schematic diagram of the first signal converting circuit 2 in FIG. 5. Referring to FIG. 8, the coded output signal of four bits weighted of "1", "2", "4", "8", obtained from the retaining circuit 1 in FIG. 5, is applied in parallel to column signal lines 217, 215, 213 and 211, respectively, and further through inverters 44, 43, 42 and 41, respectively, to column signal lines 218, 216, 214 and 212, respectively. Row signal lines 0, 1, 2, . . . 9 are connected by means of MOS transistors *d* to predetermined ones of the column signals lines 211 through 218. Connection of the row and column signal lines by means of MOS transistors *d* is shown in more detail in FIG. 9. As seen in FIG. 9, the row signal lines 0 through 9 are all connected to a voltage source of the low level through a resistor R. The MOS transistor *d* has the gate connected to one of the column signal lines 211 through 219, the drain connected to one of the row signal lines 0 through 9, and the source grounded. The source as grounded is in the high level with respect to the low level voltage source. It is assumed in the present specification that the MOS transistors *d* are of a type which becomes conductive when the low level input is applied to the gate electrode thereof. In addition, MOS transistors *d'* are connected between the column signal line 219 and all of the row signal lines 0 through 9. The column signal line 219 is supplied with the high level potential, only when the segment selecting signals $\overline{Sa}$ through $\overline{Sl}$ are to be withdrawn. Further, MOS transistors *d*1 are connected between the row signal lines 0 through 9 and predetermined ones out of the column signal lines 220 through 227, as shown. Connection between the row signal lines 0 through 9 and the column signal lines 220 through 226 by means of MOS transistors *d*1 is shown in FIG. 10. As seen in FIG. 10, one end of each of the column signal lines 220 through 227 is connected by a respective resistor R' to a voltage source of the low level and each MOS transistor *d*1 has the gate connected to one of the row signal lines 0 through 9, the drain connected to one of the input lines 220 through 226, and the source grounded or connected to the high level voltage source. The MOS transistors *d*1 are also of a type which becomes conductive when the low level input is applied to the gate electrode thereof. The other ends of the column signal lines 220 through 227 are each connected via inverting amplifiers 46 through 53, respectively, as necessary, to the first display DIS1 and the second signal converting circuit 3. For the purpose of display of the decimal point, the output signal from the said column signal line 219 and the decimal point indicating signal DP are applied to an AND gate 28, and the output from the AND gate 28 is, via the inverting amplifier 53, withdrawn as the output $\overline{Sl}$.

For simplicity of the explanation, operation of the FIG. 8 circuit will be first described. For the purpose of describing the operation, let it be assumed that the coded output signal from the retaining circuit 1 is "0001" representing the value of the numeral one. In brief, the first signal converting circuit shown in FIG. 8 serves to convert the output signal from the retaining circuit 1 representing in a coded manner, one-digit numerical value information into a set of segment selecting signals $\overline{Sa}$, $\overline{Sb}$, . . . $\overline{Sg}$, $\overline{Sl}$ for selecting required segments in the display tubes in the first display DIS1 so as to form a configuration of required numeral characters by selective light emission from the segments. Thus, it is appreciated that if and when the coded numerical value information signal is "0001", the high level output should be withdrawn from the output terminals $\overline{Sb}$ and $\overline{Sc}$ to cause light emission from the segments *b* and *c* in FIG. 3. Such an operation of the circuit will be described in more detail in the following. In response to the said coded numerical value information signal "0001", the high level is applied to the column signal line 217, while the low level is applied to the other column signal lines 215, 213 and 211, and accordingly the column signal line 218 is supplied with the low level, while the column signal lines 216, 214 and 212 are supplied with the high level. All the intersections between the column signal lines 212, 214, 216 and 217 and the row signal line 1 as supplied with the high level have been provided with MOS transistors *d*. Therefore, all these MOS transistors *d* do not become conductive, because of the high level in the gate electrode thereof. No MOS transistors are connected between the row signal line 1 and the column signal lines other than the column signal lines 212, 214, 216 and 217. Normally, column signal line 219 is in the high level. As a result, all the MOS transistors *d* and *d'* connected to the row signal line 1 do not become conductive, and accordingly, the row signal line 1 is forced to the low level as a function of the low level voltage source, as shown in FIG. 9. Therefore, the MOS transistors *d*1 at the intersections between the row signal line 1 and the column signal lines 221 and 222 become conductive, as seen from FIG. 10, thereby to provide the high level outputs, which are inverted by inverting amplifiers 47 and 48, respectively, to provide the outputs $\overline{Sb}$ and $\overline{Sc}$, respectively. As a result, the segments *b* and *c* in FIG. 3 are enabled to emit light, thereby to display the configuration of the Arabic numeral character of the numeral one.

It is pointed out that although in the foregoing description the display segments were shown and depicted as embodied in the flourescent segment arranged display tubes, any other types of segments, such as liquid crystal segments, may be used for the purpose of the present invention and, if and when the liquid crystal segments are used, these segments can be driven by the outputs direct from the column signal lines 221 and 222, without inversion, i.e. the outputs S*b* and S*c*, in case of the above described example. It is also printed out that this fact is applicable to any other embodiments of the present invention to be described subsequently.

In summary, the first signal converting circuit 2 first serves to convert the coded numerical value information signal applied through the column signal lines into a set of individual numeral representing signals each uniquely representing one of the numerals by means of a matrix implemented by the row signal lines 0 through 9 and column signal lines 211 through 219, thereby to provide the said individual numeral representing signals at the respective row signal lines, and further serves to convert the said individual numeral representing signals as withdrawn through the row signal lines 0 through 9 into a set of segment selecting signals for selecting required segments arranged in the minus-in-square shape in each of the display tubes of the first display DIS1 by means of a matrix implemented by the row signal lines 0 through 9 and the column signal lines 220 through 226.

In the foregoing description, the embodiment of the present invention was described as employing in the displays the well-known segment arranged display tubes. Alternatively, however, well known gas discharge tubes such as Nixie tubes may be used each of which has 10 display electrodes shaped in different Arabic numeral characters zero through nine or Arabian language numeral characters zero through nine and has a common electrode associated with the said ten electrodes for the purpose of digit driving. In such an embodiment, the above described row signal lines zero through nine each individually uniquely identifying the value of numerals 0 through 9 of the matrix implemented by the row signal lines 0 through 9 and the column signal lines 211 through 219 may be used to drive the said ten character shaped electrodes, of both the displays DIS1 and DIS2, while the matrix implemented by the row signal lines 0 through 9 and the column signal lines 220 through 226 as well as the second signal converting circuit 3 may be dispensed with. In such embodiment, the said individual numeral identifying signals obtainable from the row signal lines 0 through 9 are commonly applied to the corresponding character shaped electrodes, respectively, in the manner similar to that of the segment arranged display tubes.

Figure 11:
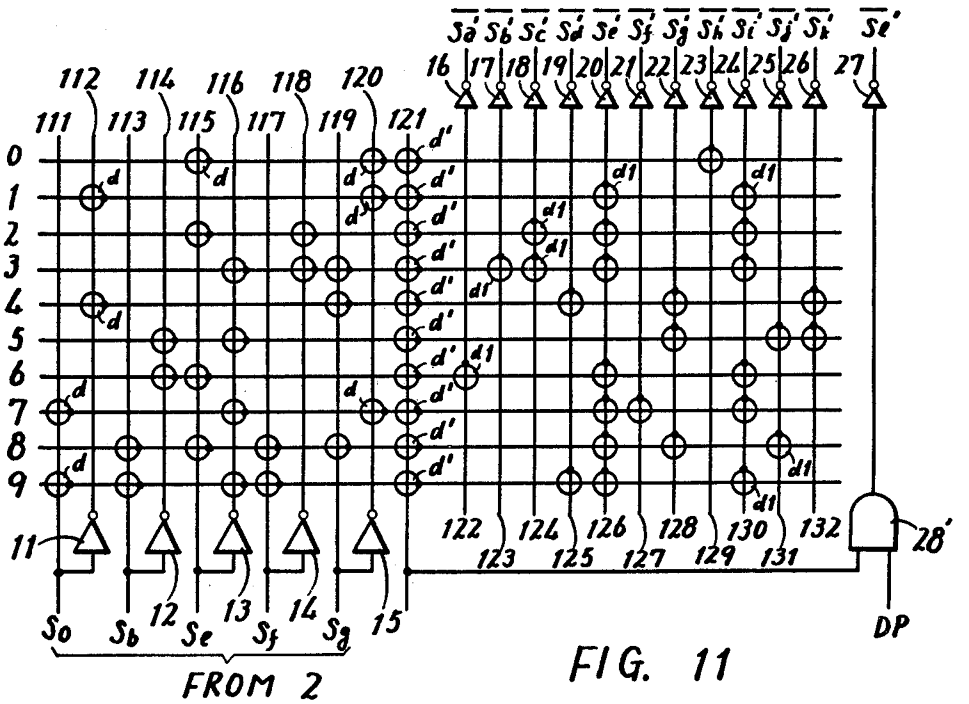
FIG. 11 is a schematic diagram of the second signal converting circuit 3 in the FIG. 5 embodiment.

FIG. 11 is a schematic diagram of the second signal converting circuit 3 shown in FIG. 5. The principle of operation of the second signal converting circuit 3 is substantially the same as that of the above described first signal converting circuit 2. Referring to FIG. 11, only the signals S*a*, S*b*, S*e*, S*f* and S*g*, as not inverted, out of the said segment selecting signals S*a* through S*g* obtainable from the first signal converting circuit 2 are applied to the column signal lines 111, 113, 115, 117 and 119, respectively, and further through inverters 11, 12, 13, 14 and 15, respectively, to the column signal lines 112, 114, 116, 118 and 120, respectively. It is appreciated that these column signal lines 111 through 120, as combined with the row signal lines 0 through 9, constitute another matrix. The predetermined intersections between these row signal lines and the column signal lines are provided with MOS transistors *d*, as shown in FIG. 11. Connection of these MOS transistors *d* is the same as shown in FIG. 9. MOS transitors *d'* are connected between the column signal line 121 and all of the row signal lines 0 through 9. The connection of these MOS transistors *d'* is also the same as shown in FIG. 9. The column signal line 121 should be forced to the high level potential, if and when the second display DIS2 is to be enabled to display the numerical value information. The row signal lines 0 through 9, combined with the column signal lines 122 through 132, constitute a further matrix. Predetermined intersections between the row signal lines and the column signal lines are provided with MOS transistors *d*1. The connection of these MOS transistors *d*1 is the same as shown in FIG. 10. The other ends of the column signal lines 122 through 132 are each connected through inverting amplifiers 16 through 26, respectively, as necessary, to the second display DIS2. The output from the said column signal line 121 is applied to one input to an AND gate 28'. The other input to the AND gate 28' is connected to receive a signal DP for displaying the period mark (.). The output from the AND gate 28' is withdrawn through an inverting amplifier 27.

Now operation will be described with reference to FIG. 11. Assuming that the coded numerical value information signal obtainable from the retaining circuit 1 is "0001" representative of the value of the numeral one, then, as seen from the previous description with reference to FIG. 8, only the outputs at the output terminals S*b* and S*c* from the first signal converting circuit 2 become the high level, while the other outputs are all the low level. Therefore, the outputs S*a* and S*g* applied to the column signal lines 111 and 119 in FIG. 11 become the low level, and thus the outputs from the inverters 11 and 15 become the high level. It is pointed out that the outputs S*a* and S*g* to be applied to the column signal lines 111 and 119 both become the low level, only if and when the coded numerical value information signal is "0001", i.e. the value of the numerical character to be displayed is the numeral one. Thus, only if and when the numeral character to be displayed is the numeral one, the outputs from the inverters 11 and 15 both become the high level, when the MOS transistors *d'* at both intersections between the row signal line 1 and the column signal lines 112 and 120 do not become conductive, because the gate input thereto is the high level. Since no MOS transistors are connected between the row signal lines 1 and the column signal lines other than the column signal lines 112 and 120, and the column signal line 121 has been brought to the high level only if and when display should be effected by the first and second displays DIS1 and DIS2, none of the MOS transistors *d* and *d'* connected to the row signal line 1 becomes conductive and accordingly the row signal line 1 is forced to the low level potential as a function of the low level voltage source, as shown in FIG. 9. As a result, the MOS transistors *d*1 connected between the row signal line 1 and the column signal lines 126 and 130 become conductive, because of the low level of the gate input thereto, and accordingly the column signal line 126 and 130 are forced to the high level, which means the high level at the outputs Se' and Si'. These outputs Se' and Si' are invert-amplified by means of inverting amplifiers 20 and 24, thereby to provide the outputs $\overline{Se}'$ and $\overline{Si}'$, respectively. Meanwhile, the row signal line 1 is connected by means of the MOS transistors *d*1 to only the column signal line 126 and 130 out of the column signal lines 122 through 132, and no MOS transistors are connected from the row signal line 1 to the other output lines.

Since the coded numerical value information was assumed to be "0001", the row signal lines other than the row signal line 1 out of these row signal lines 0 through 9 become the high level, in view of the fact that at least one of the said predetermined MOS transistors *d* becomes conductive. Accordingly, the column signal lines 122 through 125, 127 through 129 and 132 which are not connected to the row signal line 1 by the MOS transistors *d*1 are all the low level. As a result, the segments other than the segments *e'* and *i'* in FIG. 4 are not driven and thus do not emit light. When the period mark is to be displayed, the input DP to the AND gate 28' is brought to the high level, whereby the outputs $\overline{S}'e$ from an inverting amplifier 27 is brought to the low level, thereby to enable the segment to emit light.

Figure 12:
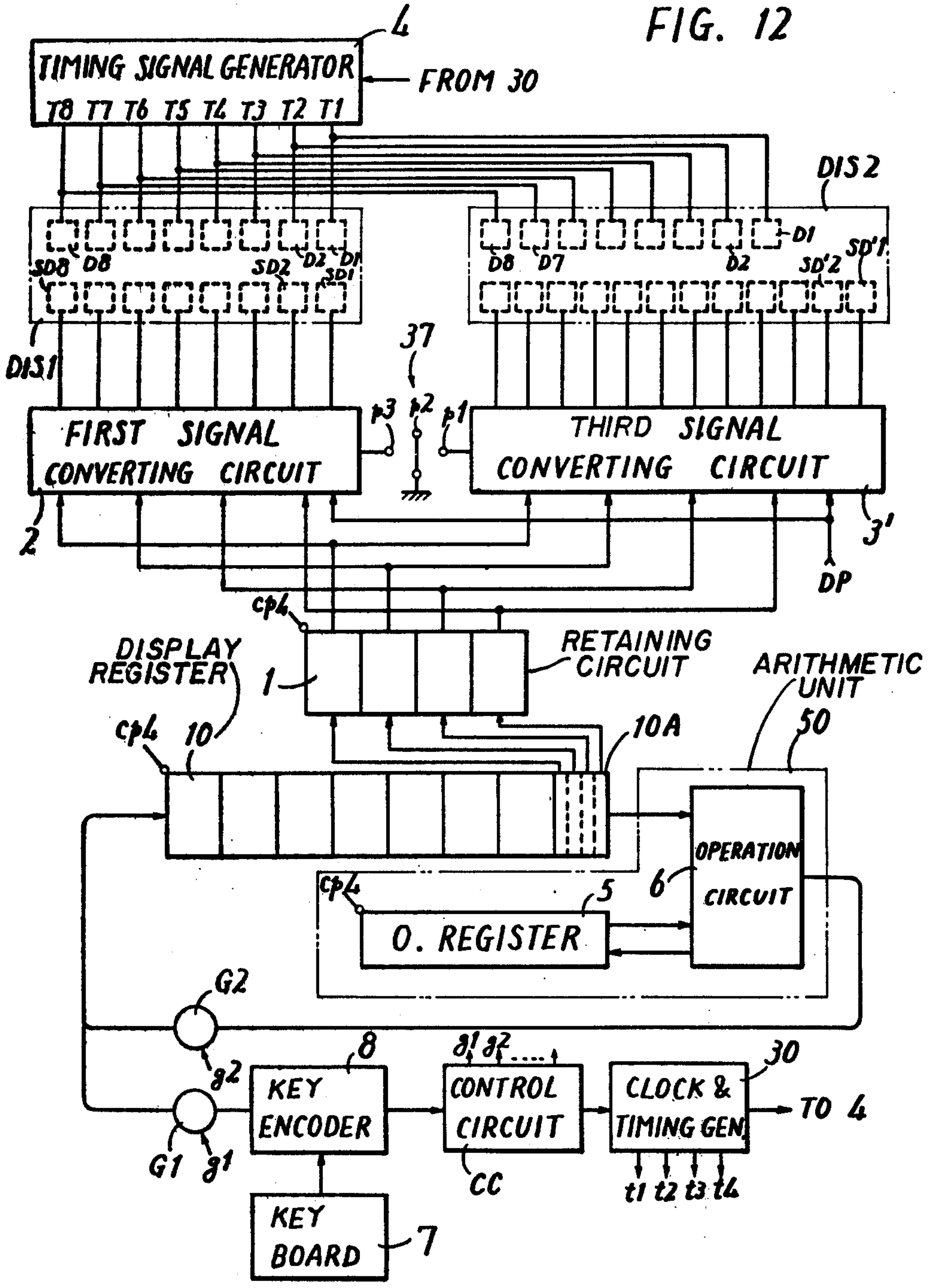
FIG. 12 is a block diagram of a desk top electronic calculator of another embodiment of the present invention to be embodied in the FIG. 1 calculator.

FIG. 12 is a block diagram of a desk top electronic calculator of another embodiment to be embodied in the FIG. 1 calculator, which includes a block diagram of a display as modified in comparison to with that of the FIG. 8 embodiment. Thus, illustration of FIG. 12 is similar to that of FIG. 8. Therefore, the same reference characters are used to designate the same portions as those in FIG. 8. In the following, only different portions in the FIG. 12 embodiment will be described, while description of the same portions will be omitted. In the FIG. 12 embodiment, the coded numerical value information signal from the retaining circuit 1 is applied to a first signal converting circuit 2 and a third signal converting circuit 3'. The first signal converting circuit 2 is responsive to the said coded numerical value information signal to convert it to a first set of segment selective signals for allowing for selective light emission from the segments to selectively constitute a configuration of the numerical characters of the Arabic numerals, which segment selecting signals are applied to the first display DIS1. Quite similarly, the third signal converting circuit 3' is also responsive to the said coded numerical value information signal to convert it into a second set of segment selecting signals to selectively enable the segments to emit light so as to constitute a configuration of the numeral characters of the Arabian language numerals, which segment selecting signals are applied to the second display DIS2. The third signal converting circuit 3' will be described subsequently with reference to FIG. 13. In the present embodiment, a switch 37 is interconnected between the first and the third signal converting circuit in the same manner as the switch EXS in FIG. 11. The switch 37 is turned to the right side P1 as viewed in the figure when the display DIS1 is to be enabled, turned to the left side P3 as viewed in the figure when the display DIS2 is to be enabled, and placed in the neutral position P2 when both of the displays DIS1 and DIS2 are to be enabled simultaneously.

Figure 13:
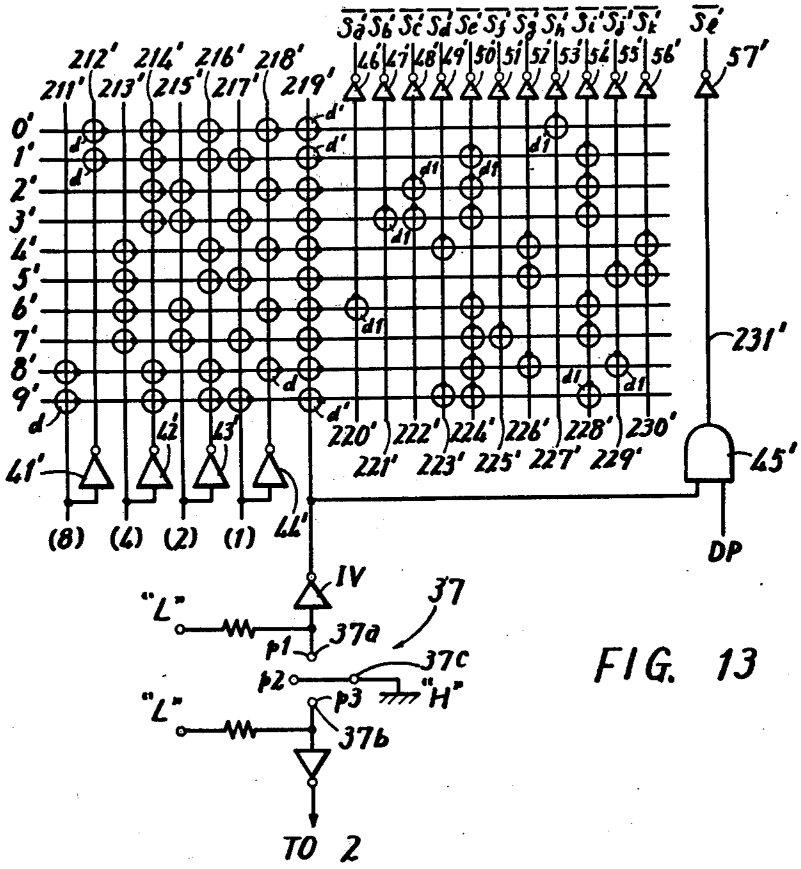
FIG. 13 is a schematic diagram of the third signal converting circuits 3' in the FIG. 12 embodiment.
Figure 14:
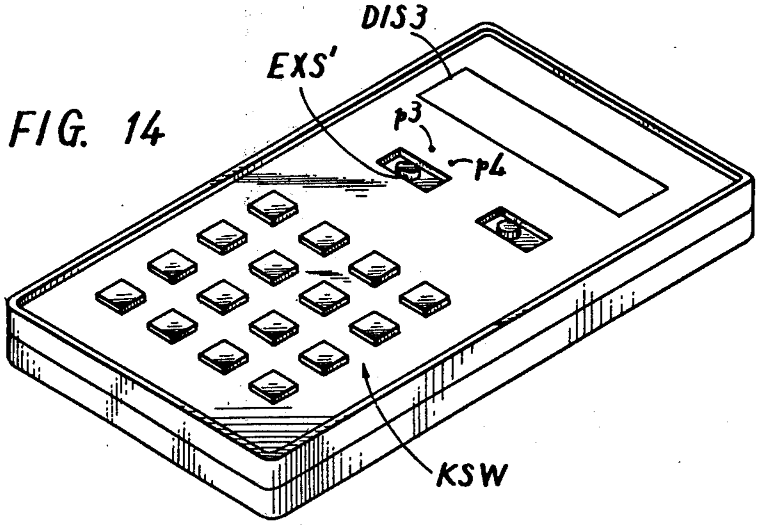
FIG. 14 is a perspective view of a desk top electronic calculator of another embodiment of the present invention.

Referring to FIG. 13, the coded numeral value information signal consituted of the four-bit structure obtainable from the retaining circuit 1 in FIG. 12 is applied to the respective column signal lines 211', 213', 215' and 217', respectively, and further through inverters 41', 42', 43' and 44' to the respective column signal lines 212', 214', 216' and 218', respectively. The row signal lines 0' through 9' are connected to the row level voltage source through resistors, as similar to the row signal lines 0 through 9 in FIGS. 8 and 11. MOS transistors *d* are connected between the row signal lines 0' through 9' and the column signal lines 211' through 219', which MOS transistors are disposed in exactly the same manner as that in FIG. 8 and therefore are designated by the same reference characters *d* as that in FIG. 8. On the ters of the Arabic numerals. When the row signal line 343 is forced to the high level, the input to the gate electrode of the MOS transistors *d*0 connected to the column signal lines 331 through 342 becomes the high level, and therefore these MOS transistors *d*0 do not become conductive, but the input to the gate electrode of the MOS transistors *d*0 connected to the column signal lines 331' through 342' becomes the low level because of the inversion to the low level by means of the inverter 344. Accordingly, the MOS transistors *d*0 connected to the column signal lines 331' through 342' all become conductive, whereby the column signal lines 331' through 342' are all forced to the high level. The column signal lines 331 through 342 remain the low level in that situation. It is appreciated that in such a situation the right side input as viewed in the figure to the AND gates 50 through 61 all become the high level. Now assume that the coded numerical value information "0010" representative of the value of the numeral two is provided by the retaining circuit 1. Accordingly, the column signal lines 311, 313 and 314 becomes the low level, while the column signal line 312 becomes the high level, whereas the column signal lines 315, 317 and 318 become the high level, and the column signal line 316 becomes the low level. In such situation, the column signal lines 315, 312 and 317 are the high level and therefore the input to the gate electrode of the MOS transistors *d* connected to the row signal line 2 are all the high level and accordingly these MOS transistors *d* do not become conductive. As a result, the row signal line 2 is the low level. As for the other row signal lines 0, 1, 3 through 9, at least one of the MOS transistors *d* connected to these row signal lines receives the low level at the gate electrode thereof, so that the said transistor *d* becomes conductive, whereby the row signal lines 0, 1, 3 through 9 all become the low level. Since the row signal line is the low level, only the MOS transistor d1 connected to the row signal line 2 become conductive. As a result, the column signal lines 331, 333, 333', 335', 336 338, 340', and 342 become the high level. Of these column signal lines, the column signal lines 333', 335', and 340' have become the high level because of the low level output from the inverter 344. Therefore, the column signal lines 331, 333, 336, 338 and 342 are brought to the high level by the low level at the row signal line 2, and the high level in these column signal lines 331, 333, 336, 338 and 342 are applied to the left side input, as viewed in the figure, of the AND gates 350, 352, 355, 357 and 361, whereby the outputs from the AND gates 350, 352, 355, 357 and 361 become the high level and the outputs $\overline{Sa}''$, $\overline{Sc}''$, $\overline{Sf}''$, $\overline{Sh}''$ and $\overline{Sl}''$ from the inverting amplifiers 450, 452, 455, 457 and 461 become the low level, with the result that the segments *a''*, *c''*, *f'* and *h''* and 1'' are enabled in each digit position of the display DIS3. Since in such situation the row signal lines 0, 1, 3 through 9 other than row signal line 2 are all the high level, the output from the AND gates other than the AND gates 350, 352, 355, 357 and 361 do not become the high level, whereby the segment other than the segments *a''*, *c''*, *f'*, *h''* and 1'' are not enabled. When the period mark is to be displayed, the input DP to the AND gate 362 is brought to the high level, whereby the signal $\overline{Sm}''$ is provided.

In case where the numeral characters of the Arabian language numerals are to be displayed, the switch EXS' is turned so that the row signal line 343 is brought to the low level. At that time the MOS transistors d0 connected to the column signal lines 331 through 342 become conductive, since the gate input thereto is the low level, and these column signal lines 331 through 342 become the high level. Since the output from the inverter 344 is the high level at that time, the MOS transistors d0 connected to the column signal lines 331 through 342 receive the high level at the gate thereof and do not become conductive. Therefore, the potential of the column signal lines 331' through 342' is the low level, so far as this situation is maintained. Therefore, in such situation the input at the left side, as viewed in the figure, to the AND gates 350 through 361 have become the high level. Then, assuming that the coded numerical value information signal of "0010" representative of the value of the numeral two is provided from the retaining circuit 1 to display the numeral character of the Arabian language numeral two, for example, only the row signal line 2 becomes the low level, while the remaining the row signal lines 0, 1, 3 through 9 are the high level, in the same manner as mentioned above. Accordingly, the column signal lines 331, 332, 333', 335', 336, 338, 340 and 342 become the high level. However, of these lines, the column signal lines 331, 333, 336, 338 and 342 have already become the high level, inasmuch as the column signal line 343 was brought to the low level. Since the column signal lines 333', 335' and 340' have become the high level, the input at the right side to the AND gate 352, 354 and 359 also become the high level, whereby the outputs from the AND gates 352, 354, and 359 become the high level. Accordingly, the outputs $\overline{Sc}''$, $\overline{Se}''$ and $\overline{Sj}''$ from the signal converting circuit 3'' become the low level, thereby to drive the display segments *c''*, *e''*, *j''* in each digit position of the display DIS3. Assuming that the numeral character represented by the coded numercial value information signal "0010" is to be displayed in the right most digit position of the display DIS3, the timing signal generator 4 provides the digit timing signal T1 at that timing, which is applied to the right most digit position of the display DIS3. As a result, only the display segments *c''*, *e''* and j'' of the right most digit position of the display DIS3 are caused to emit light. This light emission from the display segments *c''*, *e''*, and *j''* represents a configuration of the numeral characters of the Arabian language numeral two, i.e. "   ", as seen from FIG. 15. Indication of the period mark is effected by bringing in the input DP to the AND gate 362 to the high level.

Figure 15:
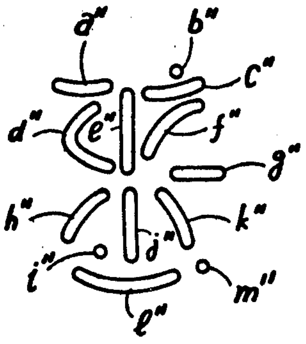
FIG. 15 is a view of the display unit in the respective digit display positions in the display DIS3 in the FIG. 14 embodiment, said unit having a plurality of segments arranged as shown for selectively displaying one of the numerals by either the Arabic numeral characters or the Arabian language numeral characters in the common digit display position.
Figure 18:
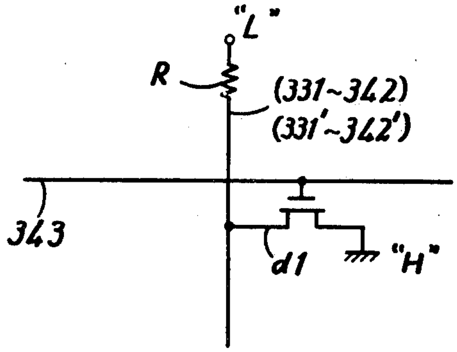
FIG. 18 shows a connection between the row and column signal lines by means of MOS transistors in the FIG. 17 circuit.

As seen from the foregoing description, assuming that the coded numerical value information signal is that which corresponds to the value of the numeral two, only the row signal line 2 is brought to the low level, whereby the column signal lines 331, 333, 336, 338 and 342 are brought to the high level, and the column signal lines 333', 335' and 340' are also brought to the high level. The high level in the column signal lines 331, 333, 336, 338 and 342 constitutes a signal for displaying the numeral character of the Arabic numeral two in the display unit as shown in FIG. 15, while the high level in the column signal lines 333', 335' and 340' constitutes a signal for displaying the numeral character of the Arabian language numeral two in the display unit in FIG. 15. It is pointed out that these two kinds of the signals for the different kinds of the numeral characters are obtained simultaneously by conversion of the coded numerical value information on signal obtainable from the register 10, and thus from the retaining circuit 1. The selection signal for selecting the signal for the Arabic numerals is obtained by turning the switch EXS', thereby to bring the row signal line 343 to the high level. More specifically, when the switch EXS' is turned to bring the row signal line 343 to the high level, the signal for displaying the numeral characters of the Arabic numerals, i.e. the high level in the column signal lines 331, 333, 336, 338 and 342, in case of the numeral two, are withdrawn by way of the high level outputs from the AND gates 350, 352, 355, 357 and 361, whereby the numeral character of the Arabic numeral two, i.e., "ア" is displayed by the display unit as shown in FIG. 15. On the other hand, the selecting signal for selecting the signal representative of the Arabian language numerals is obtained by turning the switch EXS to bring the row signal line 343 to the low level. More specifically, when the switch EXS' is turned to bring the row signal line 343 to the low level, the signals for displaying the numeral characters of the Arabian language numerals, i.e. the high level in the column signal lines 333', 335' and 340', in case of the numeral two, are withdrawn as the high level outputs from the AND gates 352, 354, and 359, whereby the numeral characters of the Arabian language numeral two, i.e. a configuration of "ア" is displayed by the display unit as shown in FIG. 15. The display unit is responsive to the signal for displaying the Arabic numerals and the signal for displaying the Arabian language numerals obtainable from the signal converting circuit 3' as well as the display mode designating output obtained from the switch EXS' to selectively display a configuration of one of the numeral characters of either the Arabic numerals or the Arabian language numerals.

Figure 16:
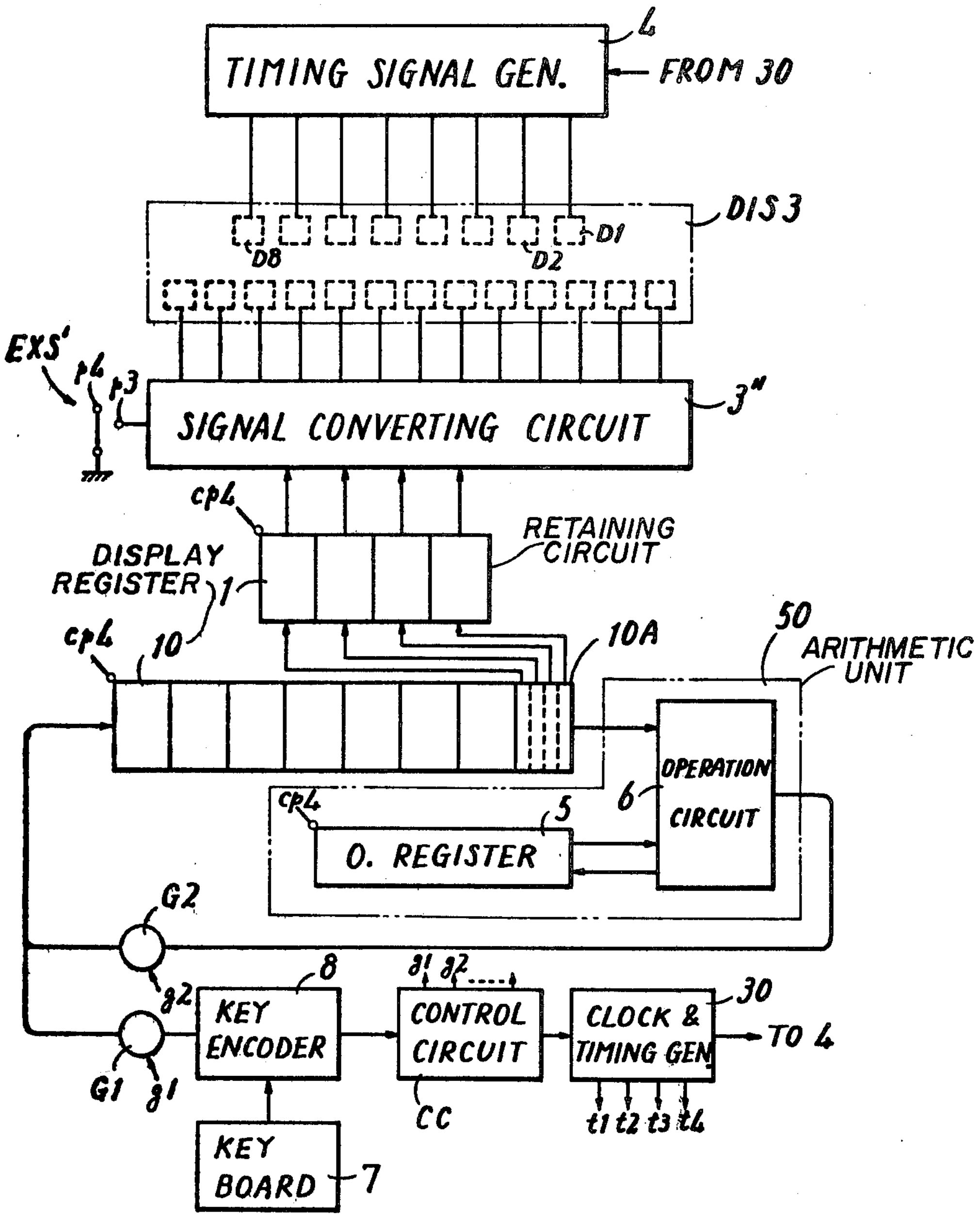
FIG. 16 is a block diagram of the FIG. 14 calculator which employs a further embodiment of the display of the present invention to be embodied in the FIG. 14 calculator.
Figure 17:
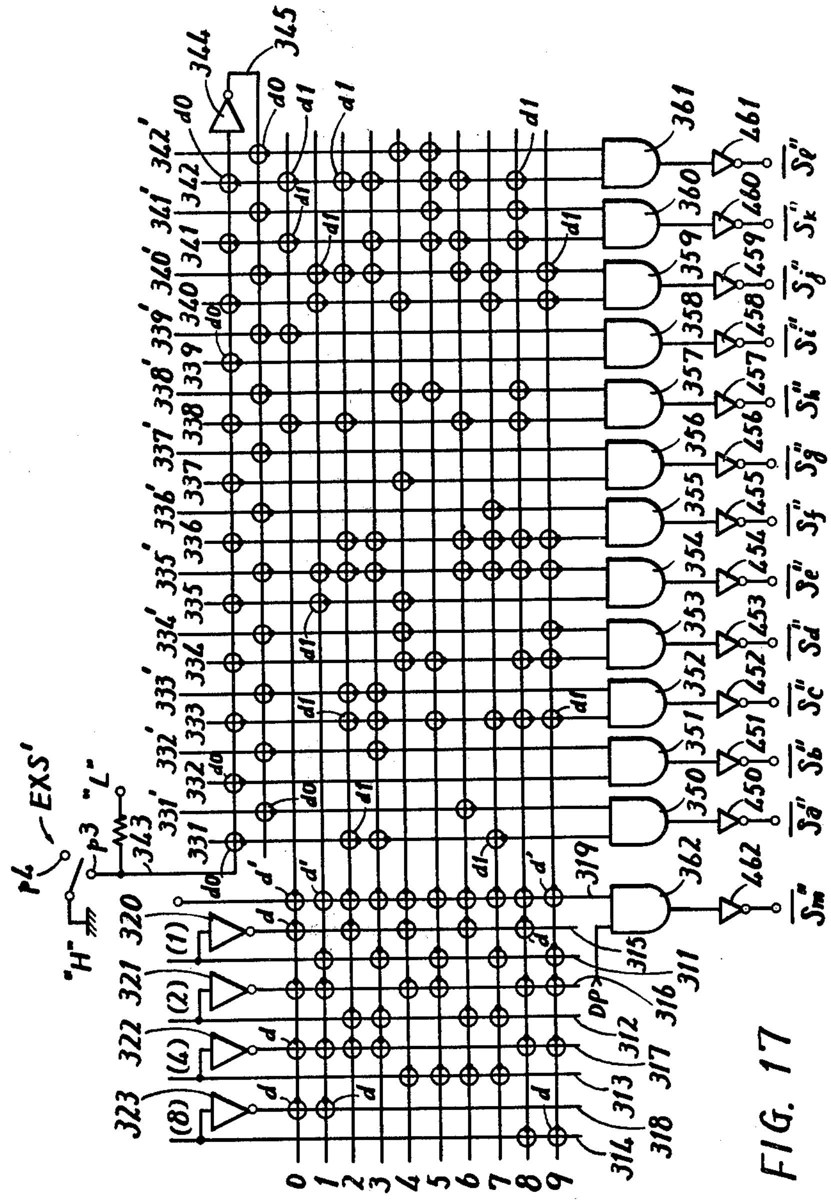
FIG. 17 is a schematic diagram of the signal converting circuits 3'' in the FIG. 16 embodiment.

As seen from the foregoing description, the FIG. 16 embodiment comprises a single display having a plurality of digit display positions each capable of displaying selectively one of numerals 0 through 9 by first and second different kinds of groups of numeral characters, say Arabic numerals and the Arabian language numerals. respectively, thereby to selectively display multi-digit numerical value information by these different kinds of groups of numeral characters. According to the present embodiment, the display may be made simple in structure and hence may be made small sized and yet can be manufactured with low cost.

Although in the foregoing the present invention was described as embodied in a small sized electronic calculator, it is to be clearly understood that the same is by way of illustration and example only and is not to be taken by way of limitation. As readily understood by those skilled in the art, the present invention can be advantageously embodied in any other types of electronic data processing machines such as computer terminal units, electronic cash registers, and the like. The present invention is also applicable to a display of numerical value information by any other kinds of groups of numeral characters such as Roman numerals, Chinese character numerals, and the like. Thus, it is clearly understood by those skilled in the art that various modifications and changes of the present invention may be made without departing from the spirit of the present invention. It is, therefore, intended that the spirit and the scope of the present invention be limited only by the terms of the appended claims.

What is claimed is:

1. An apparatus responsive to encoded signals representing numerical value information for displaying said numerical value information selectively in one of a plurality of different sets of numeral characters, said apparatus comprising means for receiving said encoded signals, converting means connected to said receiving means for converting said encoded signals into a plurality of different kinds of element select signals respectively corresponding to said different sets of numeral characters, and display means comprising a plurality of sets of different display elements corresponding respectively to said different sets of numeral characters, said display means being connected to said converting means for receiving said different kinds of element select signals and responsive to each different kind of element select signal for activating at least one selected display element from a respective one of said corresponding sets of different display elements.

2. An apparatus in accordance with claim 1, wherein said display means comprises multi-digit display positions and each numerical digit of said numerical value information is displayed in each corresponding digit display position.

3. An apparatus in accordance with claim 1, said apparatus being adapted for selective display of said numerical value information in accordance with a selected set of said plurality of different sets of characters, said apparatus further comprising means operatively associated with said converting means for selectively withdrawing a selected one of said plurality of different kinds of element select signals for representing said numerical value information by said selected set of said different sets of numeral characters, and wherein said display means is adapted to display said numerical value information by said selected set of said different sets of numeral characters.

4. An apparatus in accordance with claim 3, wherein said display means comprises multi-digit display positions and each numerical digit of said numerical value information is displayed in each corresponding digit display position.

5. An apparatus in accordance with claim 4, wherein said plurality of different sets of numeral characters comprises a first and second set thereof, and each digit display position of said display means is adapted to be capable of selectively displaying a numeral by said selected set of said first and second different sets of numeral characters.

6. An apparatus in accordance with claim 5, wherein each digit display position of said display means comprises an arrangement of a plurality of elements in a common digit position for allowing the display of a numeral in the respective digit in said numerical value information by one of said first and second sets of numeral characters by selection of at least one of said plurality of elements.

7. An apparatus in accordance with claim 1, wherein said plurality of different sets of numeral characters comprises a first and second set thereof, and said display means comprises a first display means portion responsive to said first set of element select signals for displaying said numerical value information by said first set of numeral characters; and a second display means portion responsive to said second set of element select signals for displaying said numerical value information by said second set of numeral characters.

8. An apparatus in accordance with claim 7, which further comprises means operatively associated with said first and second display means for selecting one of said first and second display means portions for allowing display operation in said selected one of said first and second display means portions by the corresponding one of said first and second different sets of numeral characters.

9. An apparatus in accordance with claim 7, which further comprises means operatively associated with said first and second display means for selecting one or both of said first and second display means portions in the corresponding one or both of said first and second different sets of numeral characters.

10. An apparatus in accordance with claim 2, wherein said numerical value information comprises a plurality of digits, said apparatus further comprising:

generating means for generating digit timing signals, means connected to said generating means and responsive to said digit timing signals for successively enabling each of said multi-digit display positions of said display means in a predetermined digit timing sequence, means responsive to said generating means and to said receiving means for providing, in said predetermined digit timing sequence, an element select signal representative of each respective digit of said numerical value information, and means for applying said element select signal commonly to said multi-digit display positions in said display means, whereby the respective digit of said numerical value information is displayed in the enabled corresponding digit display position in said display means in said predetermined digit timing sequence.

11. An apparatus in accordance with claim 1, wherein said plurality of different sets of numeral characters comprises a first and second set thereof, and said converting means comprises first converting means for converting said coded numerical value information signal into said first kind of element select signal for representing said numerical value information by said first set of numeral characters, and second converting means for converting said coded numerical value information signal into said second kind of element select signal for representing said numerical value information by said second set of numeral characters.

12. An apparatus in accordance with claim 11, wherein said first converting means comprises third converting means for converting said numerical value information signal into a set of individual signals each uniquely identifying the numeral in the respective digit in said numerical value information, and fourth converting means connected to said third converting means for converting said individual numeral identifying signals into said first kind of element select signal for representing said numerical value information by said first set of numeral characters; and wherein said second converting means comprises:

fifth converting means for converting said numerical value information signal into a set of individual signals each uniqely identifying the numeral in the respective digit in said numerical value information, and sixth converting means connected to said fifth converting means for converting said individual numeral identifying signals into said second kind of element select signal for representing said numerical value information by said second set of numeral characters.

13. An apparatus in accordance with claim 1, wherein said plurality of different sets of numeral characters comprises a first and second set thereof, and said converting means comprises first converting means for converting said numerical value information signal into said first kind of element select signal for representing said numerical value information by said first set of numeral characters, and second converting means connected to said first converting means for converting said first kind of element select signal into said second kind of element select signal for representing said numerical value information by said second set of numeral characters.

14. An apparatus in accordance with claim 13, wherein said first converting means comprises third converting means for converting said numerical value information signal into a first set of individual signals each uniquely identifying the numeral of the respective digit in said numerical value information, and fourth converting means for converting said first set of individual numeral identifying signals into said first kind of element select signals for representing said numerical value information by said first set of numeral characters, and said second convertng means comprises fifth converting means for converting said first kind of element select signal for representing said numerical value information by said first set of numeral characters into a second set of individual signals uniquely identifying the numeral in the respective digit in said numerical value information, and sixth converting means for converting said second set of individual numeral identifying signals into said second kind of element select signals for representing said numerical value information by said second set of numeral characters.

15. An apparatus in accordance with claim 1, wherein said plurality of different sets of numeral characters comprises a first and second set thereof, and said converting means comprises first converting means for converting said numerical value information signal into a set of individual signals each uniquely identifying the numeral in the respective digit in said numerical value information, and second converting means for converting said individual numeral identifying signals into said first and second different kinds of element select signals for representing said numerical value information by said first and second different sets of numeral characters, respectively.

16. An apparatus in accordance with claim 7, which further comprises means operatively associated with said converting means for selectively withdrawing one of said first and second kinds of element select signals for representing said coded numerical value information by a selected group of said first and second different kinds of groups of numeral characters, respectively, and wherein said display means is adapted to display said numerical value information by said selected group of said first and second different kinds of groups of numeral characters.

17. In an apparatus for displaying numerical value information, comprising:

means for receiving in a coded fashion, a signal representative of multi-digit numerical value information, each digit being represented by one of a set of numerals, converting means for converting said coded multi-digit numerical value information signal into a kind of character signal for representing said coded multi-digit numerical value information in a given character form of numeral characters 0, 1, 2, 3, . . . 9, and display means responsive to said kind of character signals for displaying said multi-digit numerical value information by said given kind of character form of numeral characters, 0, 1, 2, 3, . . . 9, wherein said display means comprises multi-digit display positions and each digit numeral is displayed in each corresponding digit display position, the improvement comprising at least one further display means for displaying said numerical value information selectively in a form distinct from said given kind of character form, and wherein said converting means is adapted to convert said multi-digit numerical value information signal into a plurality of different kinds of character signals for representing said coded multi-digit numerical value information in a corresponding plurality of different kinds of character forms of numeral characters 0, 1, 2, 3, . . . 9, and wherein said display means and said at least one further display means are adapted to be responsive, respectively, to said different kinds of character signals to display said multi-digit numerical value information respectively by corresponding said different kinds of character forms of numeral characters 0, 1, 2, 3, . . . 9, which are different in character forms.

18. In an apparatus in accordance with claim 17, which further comprises means for selectively withdrawing one of said different kinds of character signals for representing said coded multi-digit numerical value information by one of said different kinds of character forms of numeral characters, 0, 1, 2, 3, . . . 9, respectively, and wherein said display means is adapted to display said multi-digit numerical value information by said selected one character form of said different kinds of character forms of numeral characters 0, 1, 2, 3, . . . 9.

19. In an apparatus in accordance with claim 18, wherein a digit display position of said display means is adapted to be capable of selectively displaying a numeral by said selected one character form of said different kinds of character forms of numeral characters 0, 1, 2, 3, . . . 9.

20. In an apparatus in accordance with claim 19, wherein each digit display position of said display means comprises an arrangement of a plurality of elements in a common digit position for allowing the display of a numeral in the respective digit in said coded multi-digit numerical value information by one of said different kinds of character forms of numeral characters 0, 1, 2, 3, . . . 9 by selection of said plurality of elements.

21. In an apparatus in accordance with claim 20, which further comprises means for selecting one of said first and second display means portions for allowing display operation in said selected one of said first and second display means portions by the corresponding one of said first and second different kinds of character forms of numeral characters 0, 1, 2, 3, . . . 9.

22. In an apparatus in accordance with claim 17, which further comprises means for selecting said display means and said at least one further display means for allowing display operation in said display means and said at least one further display means in the corresponding different kinds of character forms of numeral characters 0, 1, 2, 3, . . . 9.

23. In an apparatus in accordance with claim 17, which further comprises means for generating digit timing signals, means responsive to said digit timing signals for enabling said multi-digit display positions of said display means in a digit timing sequence, means responsive to said means for generating digit timing signals and said storage means for providing, in said digit timing sequence, a digit numeral signal representative of the numeral of the respective digit of said multi-digit numerical value information, and means for applying said digit numeral signal commonly to said multi-digit display positions in said display means, whereby the numeral in the respective digit of said multi-digit numerical value information is displayed in the enabled corresponding digit display position in said display means in said digit timing sequence.

24. In an apparatus in accordance with claim 17, wherein said different kinds of character forms comprise two kinds of character forms, and said converting means comprises first converting means for converting said coded multi-digit numerical value information signal into said first kind of character signal for representing said coded multi-digit numerical value information by said first kind of character form of numeral characters 0, 1, 2, 3, . . . 9, and second converting means for converting said coded multi-digit numerical value information signal into said second kind of character signal for representing said coded multi-digit numerical value information by said second kind of character form of numeral characters 0, 1, 2, 3, . . . 9.

25. In an apparatus in accordance with claim 24, wherein said first converting means comprises third converting means for converting said coded multi-digit numerical value information signal into a set of individual signals each uniquely identifying the numeral in the respective digit in said coded multi-digit numerical value information, and fourth converting means for converting said individual numeral identifying signals into said first kind of character signal for representing said coded multi-digit numerical value information by said first kind of character form of numeral characters, and said second converting means comprises fifth converting means for converting said coded multi-digit numerical value information signal into a set of individual signals each uniquely identifying the numeral in the respective digit in said coded multi-digit numerical value information, and sixth converting means for converting said individual numeral identifying signals into said second kind of character signal for representing said coded multi-digit numerical value information by said second kind of character form of numeral characters 0, 1, 2, 3, . . . 9.

26. In an apparatus in accordance with claim 17, wherein said different kinds of character forms comprise two kinds of character forms, and said converting means comprises first converting means for converting said coded multi-digit numerical value information signal into said first kind of character signal for representing said coded multi-digit numerical value information by said first kind of character form of numeral characters 0, 1, 2, 3, . . . 9, and second converting means for converting said first kind of character signal into said second kind of character signal for representing said coded multi-digit numerical value information by said second kind of character form of numeral characters 0, 1, 2, 3, . . . 9.

27. In an apparatus in accordance with claim 26, wherein said first converting means comprises third converting means for converting said coded multi-digit numerical value information signal into a first set of individual signals each uniquely identifying the numeral of the respective digit in said coded multi-digit numerical value information, and fourth converting means for converting said first set of individual numeral identifying signals into said first kind of character signal for representing said coded multi-digit numerical value information by said first kind of character form of numeral characters 0, 1, 2, 3, . . . 9, and said second converting means comprises fifth converting means for converting said first kind of character signal for representing said coded multi-digit numerical value information by said first kind of group of numeral characters into a second set of individual signals uniquely identifying the numeral in the respective digit in said coded multi-digit numerical value information, and sixth converting means for converting said second set of individual numeral identifying signals into said second kind of character signal for representing said coded multi-digit numerical value information by said second kind of character form of numeral characters 0, 1, 2, 3, . . . 9.

28. In an apparatus in accordance with claim 17, wherein said different kinds of character forms comprise two kinds of character forms, and said converting means comprises first converting means for converting said coded multi-digit numerical value information signal into a set of individual signals each uniquely identifying the numeral in the respective digit in said coded multi-digit numerical value information, and second converting means for converting said individual numeral identifying signals into said first and second different kinds of character signals for representing said coded multi-digit numerical value information by said first and second different kinds of character forms of numeral characters 0, 1, 2, 3, . . . 9, respectively.

29. An apparatus in accordance with claim 1, wherein each set of different display elements, corresponding to one of said plurality of different sets of numeral characters, comprises a plurality of display segments, various combinations of which correspond to said numerical value information able to be selectively displayed.

30. An apparatus in accordance with claim 1, wherein each set of different display elements, corresponding to one of said plurality of different sets of numeral characters, comprises a plurality of display tubes, each display tube corresponding to one of said numerical value information able to be selectively displayed.

* * * * *

UNITED STATES PATENT AND TRADEMARK OFFICE

CERTIFICATE OF CORRECTION

PATENT NO. : 4,122,444

DATED : October 24, 1978

INVENTOR(S) : Kenichi Kitajima et al

It is certified that error appears in the above-identified patent and that said Letters Patent are hereby corrected as shown below:

Column 4, line 31, "lanugage" should be --language--.
Column 4, line 65, "l" should be --ℓ--.
Column 5, line 2, "l" should be --ℓ--.
Column 5, line 11, "l'" should be --ℓ'--.
Column 7, line 4, "fromm" should be --from--.
Column 7, line 45, "explanined" should be --explained--.
Column 12, line 13, "$\bar{S}$'e" should be --$\bar{S}$'ℓ--.
Column 12, line 19, delete "with".
Column 12, line 55, "consituted" should be --constituted--.
Column 13, line 43, "The" should be --the--.
Column 14, line 35, "dispaly" should be --display--.
Column 15, line 16, "l"" should be --ℓ"--.
Column 18, line 44, "" "" should be --"/~"--.
Column 19, line 37, "." should be --,--.
Column 21, line 63, "uniqely" should be --uniquely--.

Signed and Sealed this

*Third* Day of *April 1979*

[SEAL]

*Attest:*

RUTH C. MASON
*Attesting Officer*

DONALD W. BANNER
*Commissioner of Patents and Trademarks*